July 17, 1951 W. H. CRENSHAW 2,560,636
CULTIVATOR EQUIPMENT FOR TRACTORS
Filed Feb. 27, 1948 3 Sheets-Sheet 1

Wade H. Crenshaw
INVENTOR.

BY
*Clarence A. O'Brien*
*and Harvey B. Jacobson*
Attorneys

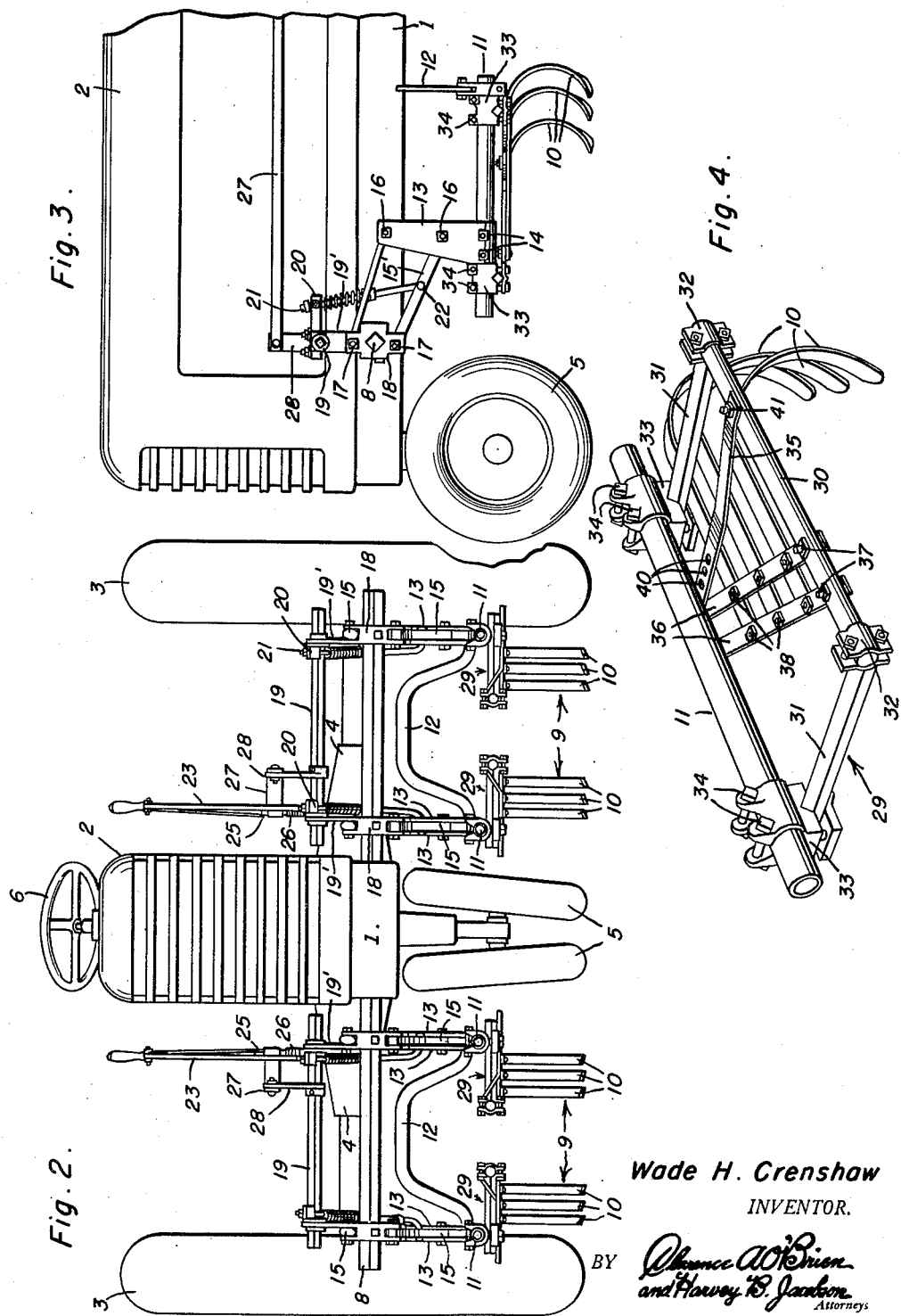

July 17, 1951 W. H. CRENSHAW 2,560,636
CULTIVATOR EQUIPMENT FOR TRACTORS
Filed Feb. 27, 1948 3 Sheets-Sheet 3
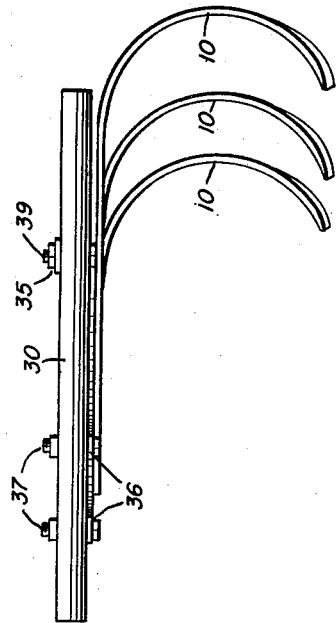
Fig. 6.
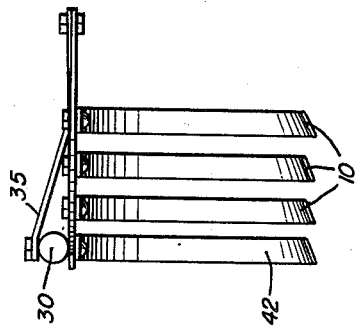
Fig. 7.
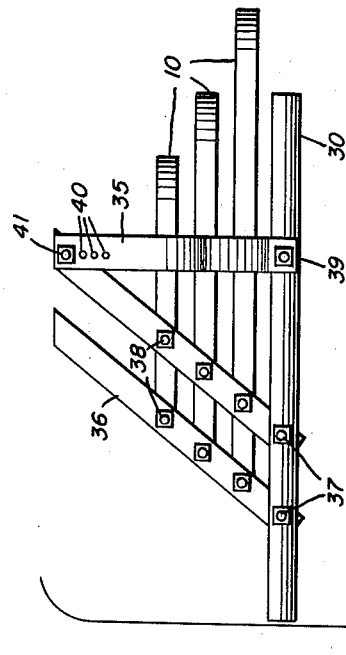
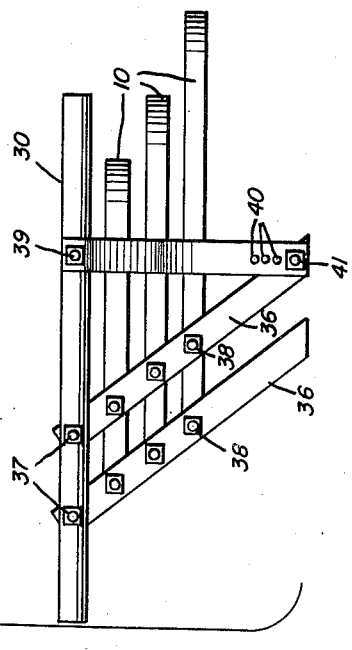
Fig. 5.
Wade H. Crenshaw
INVENTOR.
BY
Attorneys Patented July 17, 1951

2,560,636

UNITED STATES PATENT OFFICE 2,560,636

CULTIVATOR EQUIPMENT FOR TRACTORS

Wade H. Crenshaw, Monroe, Ga.

Application February 27, 1948, Serial No. 11,720

4 Claims. (Cl. 97—175)

My invention relates to improvements in cultivator equipment for tractors.

The primary object of my invention is to provide gang cultivator equipment for the usual farm tractor adapted for one- or two-row cultivation along high sloping rows at angles corresponding to the slope at opposite sides of the rows.

Another object is to provide cultivator equipment of the character designated which is adapted for use in gathering peanuts, potatoes, and the like in an efficient manner.

Other and subordinate objects within the purview of my invention, together with the precise nature of my improvements will be readily understood when the succeeding description and claims are read with reference to the drawings accompanying and forming part of this specification.

In said drawings:

Figure 2 is a view in front elevation of the same;

Figure 3 is a fragmentary view in side elevation of the same;

Figure 4 is a view in perspective of one of the gang cultivator units drawn to a larger scale;

Figure 5 is a composite view in plan of one pair of the gang cultivator units with parts eliminated;

Figure 6 is a view in side elevation of one of the gang cultivator units shown in Figure 5; and Figure 7 is a view in front elevation of one of the gang cultivator units with parts eliminated and illustrating a modified arrangement of cultivator implements.

Figure 1:
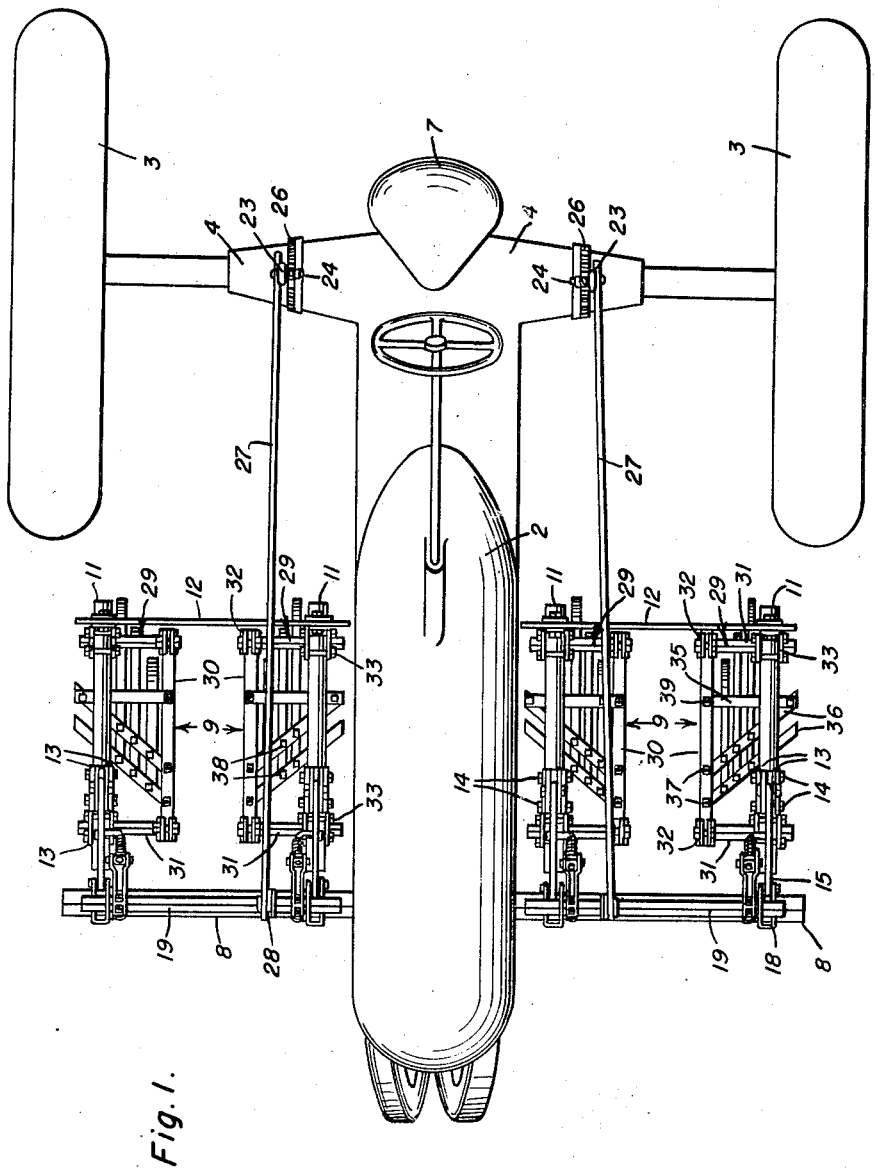
Figure 1 is a view in plan of a farm tractor equipped according to my invention in a preferred embodiment thereof.

Referring now to the drawings by numerals, my improvements have been illustrated therein as forming equipment for the usual type of farm tractor, well understood in the art, and conventionally illustrated, as sufficient for the present purpose, the numeral 1 designating the chassis frame, 2 the power plant, 3 the rear traction wheels, 4 the rear axle housing, 5 the front steering wheels controlled by the usual steering wheel 6, and 7 the driver's seat. The numeral 8 designates the usual front, transverse, implement bar extending horizontally from the chassis frame upon opposite sides thereof and for attaching cultivator implements, and the like, to the tractor.

According to my invention, a pair of gang cultivator units 9 are provided upon each side of the chassis frame 1, or tractor, side by side in each pair and in laterally spaced relation to trail the implement bar 8 forwardly of the traction wheels 4.

The gang cultivator units 9 each comprise a gang, preferably three, of the conventional hooked bar type implements 10 arranged side by side in laterally spaced relation and to extend longitudinally of the path of travel of the tractor, in the usual staggered arrangement in each gang.

The gang of cultivator implements 10 in each pair of gang cultivator units 9 are mounted, as presently described, upon relatively opposite sides of a pair of tubular draft bars 11, also extending longitudinally of the path of travel of the tractor in spaced apart parallel relation.

Upwardly arched yokes 12 connect the rear ends of the drawbars 11 of each pair of said cultivator units 9 and maintain said drawbars 11 spaced apart in each pair at the rear ends of said bars.

Pairs of upstanding cheek plates 13 adjacent the front ends of the drawbars 11 are clamped to opposite sides of said bars, as by bolts 14.

Pairs of vertically spaced links 15 with rear ends pivoted, as at 16, between the cheek plates 13 and with front ends pivoted, as at 17, to blocks 18 fast on the implement bar 8 provide for suspending the drawbars 11 from said bar 8 for vertical swinging adjustment of the drawbars 11 while maintaining said drawbars 11 substantially horizontal. As will be understood, a pair of the said links 15 and a block 18 are provided for the drawbar 11 of each of the gang cultivator units 9 and suspend said drawbars 11 for each pair of said units on the implement bar 8 at opposite sides of the tractor.

A pair of rock shafts 19 above the implement bar 8, parallel therewith, are journaled at opposite sides of the tractor in upstanding arms 19' on the blocks 18, each rock shaft 19 being associated with one pair of the gang cultivator units 9.

Cranks 20 on said rock shafts 19 and spring tensioned slide rods 21 slidable in said cranks 20 are pivoted, as at 22, to lowermost links 15 of the pairs so that rocking of said shafts 19 in opposite directions will result in upward and downward adjustment of the pairs of gang cultivator units 9, as will be clear.

A pair of hand levers 23 pivoted, as at 24, on the axle housing 4, in upright position at opposite sides of the tractor and adapted to be locked by the usual detents 25 and toothed sectors 26, are operatively connected by rods 27 to cranks 28 on the rock shafts 19 for rocking said shafts independently.

Returning now to the cultivator implements 10, each gang of cultivator implements 10 is mounted on the drawbar 11 of the unit by means of a right angled yoke 29 extending laterally to one side of the drawbar 11 and comprising a side bar 30 spaced from and parallel with the drawbar 11 and attached to said drawbar by end bars 31 secured at one end by clamps 32 to the ends of the side bar 30 and having the other ends thereof secured to the drawbar 11 by clamps 33 adapted to be loosened for rotation about the drawbar 11 and tightened by bolts 34 to set the same in different angular positions, whereby the yoke 29 is vertically swingable about the drawbar 11 to tilt the gang of cultivator implements 10 laterally of the path of travel of the tractor into different inclined positions.

A pair of laterally spaced, parallel, implement-carrying bars 36 are pivoted at one end, as at 37, to the side bar 30, intermediate the end bars 31, to extend diagonally across the yoke 29, and to which the front ends of the cultivator implements 10 of the gang are pivoted, as at 38. The arrangement of the implement-carrying bars 36 in each of said units 9 is such that by swinging of said bars 36 on the pivots 37, in unison, in opposite directions, the cultivator implements 10 may be adjusted laterally, relatively, to vary the spacing between the same, for working in the ground close together, or far apart, according to requirements. A crossbar 35 pivotally bolted at one end, as at 39, to the side bars 30 of the yoke 29 is provided with longitudinally spaced bolt holes 40 in its other end for selective bolting of the free end of one of said bars 36 thereto, as shown at 41, to retain and lock said pair of implement carrying bars 36 in different swung positions, and thereby retain the cultivator implements in selected spaced apart relation.

In the modified embodiment of the invention illustrated in Figure 7, an additional cultivator implement 42, similar to the implements 10, is embodied with a gang of implements 10 in the gang cultivator unit by bolting in fixed position to the under side of the side bar 30 of the unit.

As will be understood, the two pairs of gang cultivator units 9 are adapted to travel in straddling relation to two rows, not shown, to be cultivated, and by operating the hand levers 23 in opposite directions, the pairs may be adjusted vertically in unison in each pair to raise the cultivator implements 10 out of the ground, or, lower said implements into the ground to selected depths. Obviously, by raising either pair of the gang cultivator units 9 out of the ground, the remaining pair may be used to cultivate one row. By tilting the gang cultivator units 9 of the pairs, that is, adjusting the yokes 29 vertically and inclining the gangs of cultivator implements 10 laterally of the path of travel of the tractor, the gangs of cultivator implements 10 of the pairs may be inclined to cultivate at any angle corresponding to the side slope of high rows, as will be clear. By thus tilting the gang cultivator units 9 through such adjustment of the yokes 29, the gangs of cultivator units are variably elevated as may be required. However, the gangs of cultivator units 9 may be inclined without materially changing the elevation of the same by merely loosening the clamps 32, rotating the side bars 30 in the loosened clamps to tilt said units 9 toward each other in the pairs, and then tightening said clamp 32 to retain said units in selected set position. By tilting, or inclining, the gangs of cultivator implements 10 in the pairs sufficiently, the gangs may be brought close together in the pairs of units for use effectively in digging up rows of peanuts, potatoes, and the like for gathering purposes. Obviously, the stationary cultivator implement 42 of the modified embodiment of my invention will track outside the remaining cultivator implements of the gangs, but may be used advantageously in weeding between rows.

The foregoing will, it is believed, suffice to impart a clear understanding of my invention without further explanation.

Manifestly, the invention, as described, is susceptible of modification, without departing from the inventive concept, and right is herein reserved to such modifications as fall within the scope of the appended claims.

Having described the invention, what is claimed as new is:

1. A draft tool for farming, said tool including, a gang of substantially side-by-side implements, spacing bars disposed across said implements and pivotally connected with the same, a draw bar disposed substantially longitudinally with the intended direction of draft of said implements, a lateral extension from said draw bar and including a portion on opposite sides of said implements from said draw bar for swinging vertically to different positions with the latter affording an axis, said spacing bars having ends connected with said portion of the lateral extension to swing the pivotally connected implements and thus vary the spacing between the latter, and means for securing a free-to-swing end of at least one of said spacing bars to position corresponding to desired setting of the implements.

2. A draft tool for farming, said tool including, a gang of substantially side-by-side implements, substantially parallel spacing bars pivotally connected with said implements, a draw bar disposed substantially longitudinally with the intended direction of draft of said implements, a lateral extension from said draw bar and including a portion on opposite sides of said implements from said draw bar and adjustably connected with the latter for swinging about the same to different vertical positions, said spacing bars being connected at adjacent ends to said portion of the lateral extension to swing in substantial parallelism with the pivotally connected implements and thus vary the spacing between the latter, and a brace bar for securing a free-to-swing end of at least one of said spacing bars to said portion of the lateral extension for maintaining desired setting of the implements.

3. A farm tool for attachment to a longitudinal draw bar, said tool including, a gang of substantially side-by-side implements, spacing bars disposed across said implements and pivotally connected with the same, a lateral extension for connection with said draw bar and including a portion to be situated on opposite sides of said implements from said draw bar for swinging vertically to different positions with the latter affording an axis, said spacing bars having ends connected with said portion of the lateral extension to swing the pivotally connected implements and thus vary the spacing between the latter, and means for securing a free-to-swing end of at least one of said spacing bars to position corresponding to desired setting of the implements.

4. A farm tool for attachment to a longitudinal draw bar, said tool including, a gang of substantially side-by-side implements, substantially parallel spacing bars pivotally connected with said implements, a lateral extension for connection with said draw bar and including a portion to be situated on opposite sides of said implements from said draw bar and to be adjustably connected with the latter for swinging about the same to different vertical positions, said spacing bars being connected at adjacent ends to said portion of the lateral extension to swing in substantial parallelism with the pivotally connected implements and thus vary the spacing between the latter, and a brace bar for securing a free-to-swing end of at least one of said spacing bars to said portion of the lateral extension for maintaining desired setting of the implements.

WADE H. CRENSHAW.

REFERENCES CITED

The following references are of record in the file of this patent:

UNITED STATES PATENTS

| Number | Name | Date |
|---|---|---|
| 983,450 | Kelly | Feb. 7, 1911 |
| 1,047,564 | Raybourn et al. | Dec. 17, 1912 |
| 1,574,684 | Oliver | Feb. 23, 1926 |
| 1,855,785 | Altgelt | Apr. 26, 1932 |
| 2,023,049 | Hammock | Dec. 3, 1935 |
| 2,423,148 | Johnson | July 1, 1947 |